(12) United States Patent
Mejia et al.

(10) Patent No.: US 9,294,403 B2
(45) Date of Patent: Mar. 22, 2016

(54) MECHANISM TO CONTROL RESOURCE UTILIZATION WITH ADAPTIVE ROUTING

(71) Applicant: Intel Corporation, Santa Clara, CA (US)

(72) Inventors: Andres Mejia, Santa Clara, CA (US); Donglai Dai, Pleasanton, CA (US); Gaspar Mora Porta, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/125,707

(22) PCT Filed: Jun. 28, 2013

(86) PCT No.: PCT/US2013/048514
§ 371 (c)(1),
(2) Date: Dec. 12, 2013

(87) PCT Pub. No.: WO2014/209347
PCT Pub. Date: Dec. 31, 2014

(65) Prior Publication Data
US 2015/0003247 A1    Jan. 1, 2015

(51) Int. Cl.
*H04L 12/801* (2013.01)
*H04L 12/935* (2013.01)
*H04L 12/707* (2013.01)
*H04L 12/729* (2013.01)
*H04L 12/751* (2013.01)

(52) U.S. Cl.
CPC ............... *H04L 47/12* (2013.01); *H04L 45/22* (2013.01); *H04L 47/11* (2013.01); *H04L 49/30* (2013.01); *H04L 49/3018* (2013.01); *H04L 45/10* (2013.01); *H04L 45/125* (2013.01)

(58) Field of Classification Search
None
See application file for complete search history.

(56) References Cited

U.S. PATENT DOCUMENTS

| 7,221,677 | B1 | 5/2007 | Reed et al. |
| 7,426,670 | B2 | 9/2008 | Steinbusch |
| 8,601,423 | B1 * | 12/2013 | Philip ................. G06F 17/5072 703/15 |
| 2008/0056230 | A1 | 3/2008 | Santhanakrishnan et al. |
| 2008/0240117 | A1 | 10/2008 | Gavita et al. |
| 2012/0063459 | A1 | 3/2012 | Underwood et al. |
| 2012/0170582 | A1 * | 7/2012 | Abts ....................... H04L 45/06 370/392 |

OTHER PUBLICATIONS

International Search Report and Written Opinion received for PCT Patent Application No. PCT/US2013/048514 mailed on Mar. 27, 2014, 12 pages.

(Continued)

*Primary Examiner* — Ashley Shivers
(74) *Attorney, Agent, or Firm* — Alpine Technology Law Group LLC

(57) ABSTRACT

Methods and apparatus relating to techniques for controlling resource utilization with adaptive routing are described. In one embodiment, an output port for transmission of an incoming message that is to be received at an input port is determined at routing logic. The routing logic selects the output port from a first output port and a second output port based on congestion information that is detected at one or more other routing logic communicatively coupled to the routing logic. The first output port provides a deterministic route for the incoming message and the second output port provides an adaptive route for the incoming message. Other embodiments are also disclosed.

24 Claims, 8 Drawing Sheets

(56) References Cited

OTHER PUBLICATIONS

Hu et al., "DyAD—Smart Routing for Networks-on-Chip," Proceedings 41st Design Automated Conference, Jun. 7-11, 2004, 4 pages.

* cited by examiner

MECHANISM TO CONTROL RESOURCE UTILIZATION WITH ADAPTIVE ROUTING

FIELD

The present disclosure generally relates to the field of electronics. More particularly, an embodiment of the invention relates to techniques for controlling resource utilization with adaptive routing.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

When designing network systems, some primary considerations are to minimize area and power dissipation. Such limitations impose certain choices of topology, switching strategies, routing function, and architectural implementations. Balancing these choices, in turn, have a direct effect on how well network systems operate in terms of speed, power consumption, etc.

Some embodiments relate to techniques for controlling resource utilization with adaptive routing (which may also be referred to as Congestion Aware Adaptivity Threshold or CAAT). In one embodiment, an output port for transmission of an incoming message (that is to be received at an input port) is determined at routing logic (e.g., logic 150 discussed with reference to FIGS. 1-10). The routing logic selects the output port from a first output port and a second output port based on congestion information that is detected at one or more other routing logic communicatively coupled to the routing logic. The first output port provides a deterministic route for the incoming message and the second output port provides an adaptive route for the incoming message.

Figure 1:
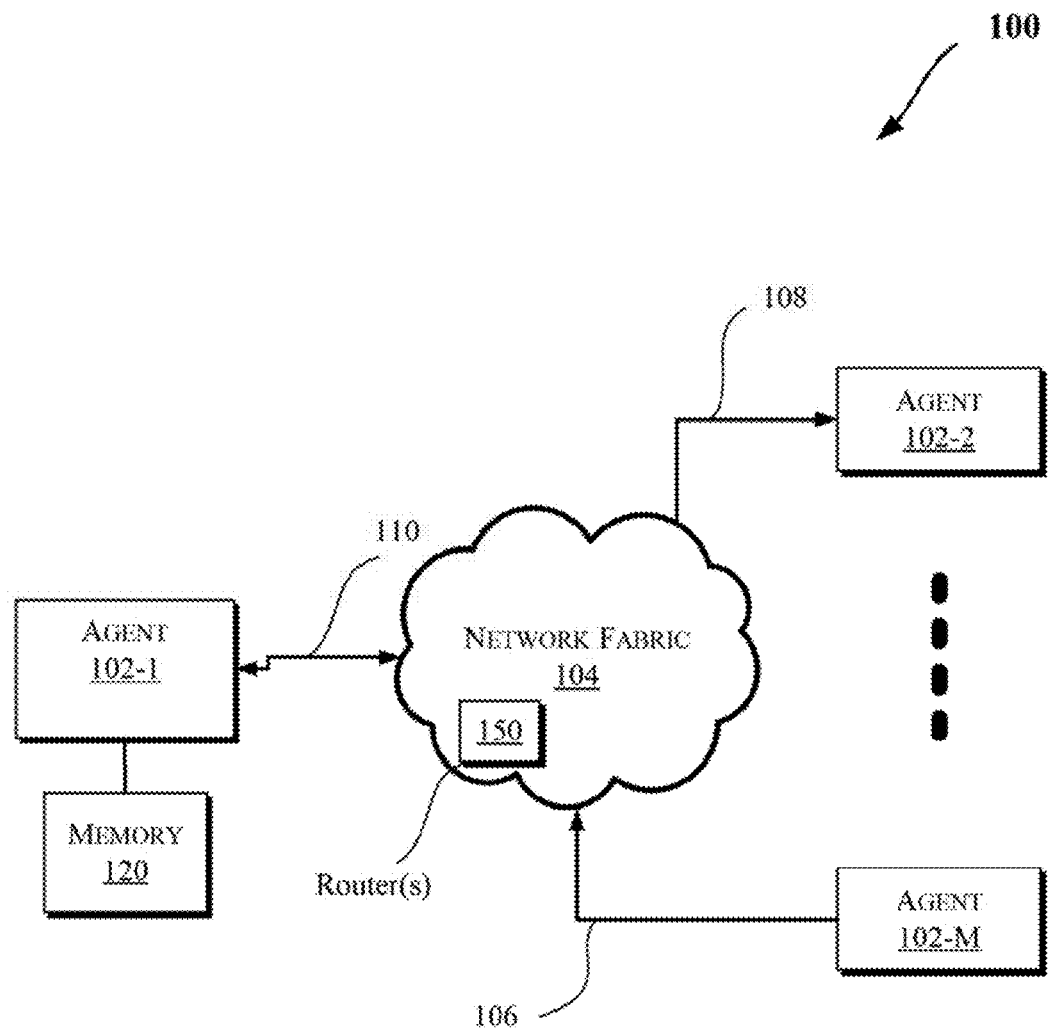
FIG. 1 illustrates a block diagram of an embodiment of a computing systems, which can be utilized to implement various embodiments discussed herein.

Various computing systems may be used to implement embodiments, discussed herein, such as the systems discussed with reference to FIGS. 1-2 and 9-10. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 9-10.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network (which may be configured as a ring in an embodiment). For example, some embodiments may facilitate component debug or validation on links that allow communication with Fully Buffered Dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g. via a unidirectional link 108), while some agent(s) (such as agent 102-1) may both transmit and receive data (e.g., via a bidirectional link 110).

Additionally, at least one of the agents 102 may be a home agent and one or more of the agents 102 may be requesting or caching agents. Generally, requesting/caching agents send request(s) to a home node/agent for access to a memory address with which a corresponding "home agent" is associated. Further, in an embodiment, one or more of the agents 102 (only one shown for agent 102-1) may have access to a memory (which may be dedicated to the agent or shared with other agents) such as memory 120. In some embodiments, each (or at least one) of the agents 102 may be coupled to the memory 120 that is either on the same die as the agent or otherwise accessible by the agent. Also, as shown in FIG. 1, network fabric 104 may include one or more routing logic 150 to couple two agent to allow for inter-agent communication. Moreover, a very thin hardware network interface couples every agent 102 to the one or more routing logic 150 in an embodiment. The thin hardware network interface may be similar to but complementary to Yunit and a Shim hardware blocks described below.

Figure 2:
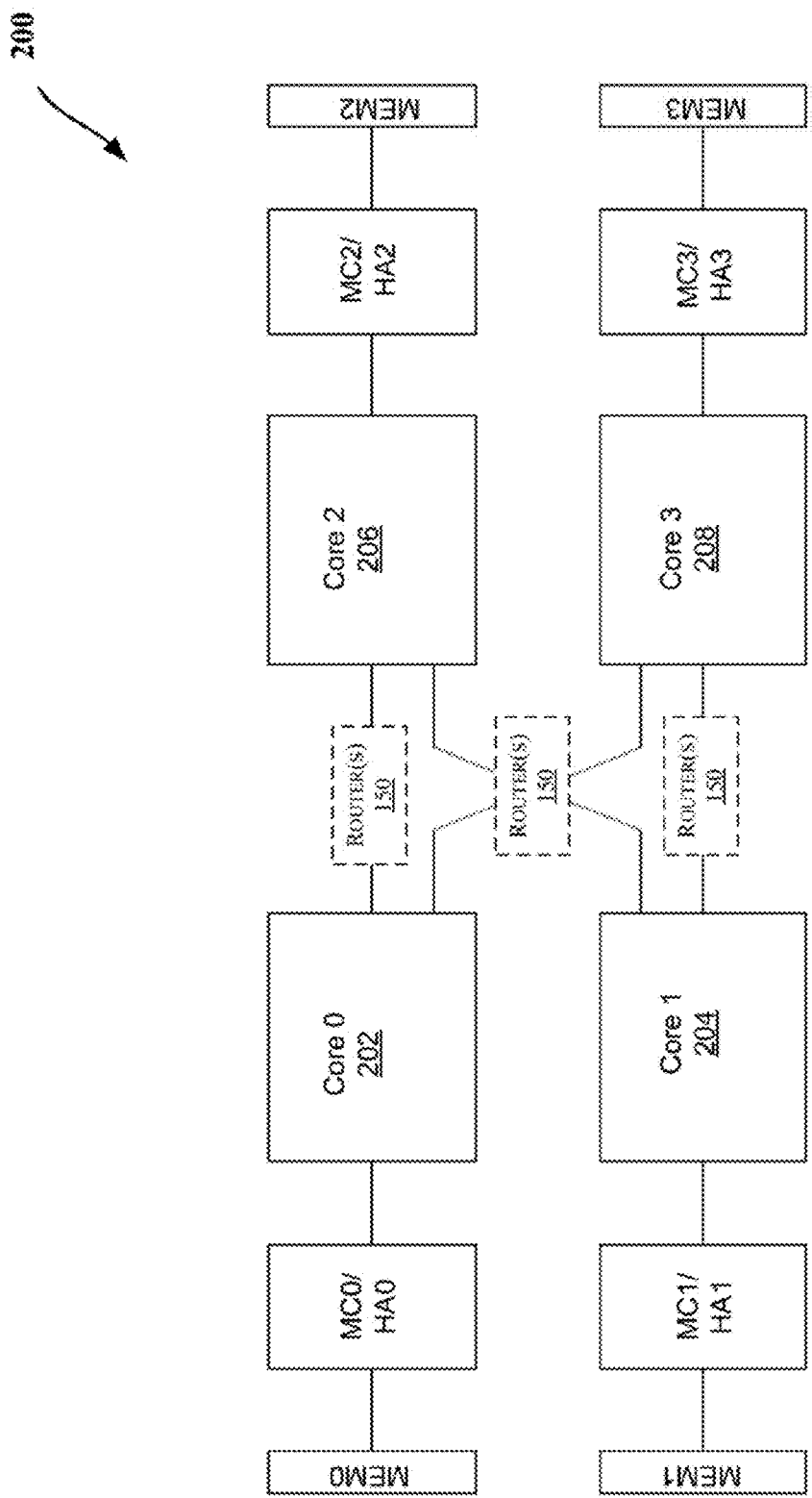
FIG. 2 illustrates a block diagram of an embodiment of a computing system, which can be utilized to implement one or more embodiments discussed herein.

FIG. 2 is a block diagram of a computing system 200 in accordance with an embodiment. System 200 includes a plurality of sockets 202-208 (four shown but some embodiments can have more or less socket). Each socket includes a processor. Also, various agents in the system 200 can communicate via routing logic 150. Even though routing logic 150 is only shown coupling 202-208, the routing logic 150 may couple other agents in system 200. Further, more or less routing logic blocks can be present in a system depending on the implementation. Additionally, each socket is coupled to the other sockets via a point-to-point (PtP) link, or a differential interconnect, such as a Quick Path Interconnect (QPI), MIPI (Mobile Industry Processor Interface), etc. As discussed with respect the network fabric 104 of FIG. 1, each socket is coupled to a local portion of system memory, e.g. formed by a plurality of Dual Inline Memory Modules (DIMMs) that include dynamic random access memory (DRAM).

In another embodiment, the network fabric may be utilized for any System on Chip (SoC or SOC) application, utilize custom or standard interfaces, such as, ARM compliant interfaces for AMBA (Advanced Microcontroller Bus Architecture), OCP (Open Core Protocol), MIPI (Mobile Industry Processor Interface), PCI (Peripheral Component Interconnect) or PCIe (Peripheral Component Interconnect Express).

Some embodiments use a technique that enables use of heterogeneous resources, such as AXI/OCP technologies, in a PC (Personal Computer) based system such as a PCI-based system without making any changes to the IP resources themselves. Embodiments provide two very thin hardware blocks, referred to herein as a Yunit and a shim, that can be used to plug AXI/OCP IP into an auto-generated interconnect fabric to create PCI-compatible systems. In one embodiment a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connects directly to a non-PC interconnect, such as an AXI/OCP interconnect. In various implementations, this bus may be an OCP bus.

In some embodiments, the Yunit implements PCI enumeration by translating PCI configuration cycles into transactions that the target IP can understand. This unit also performs address translation from re-locatable PCI addresses into fixed AXI/OCP addresses and vice versa. The Yunit may further implement an ordering mechanism to satisfy a producer-consumer model (e.g., a PCI producer-consumer model). In turn, individual IPs are connected to the interconnect via dedicated PCI shims. Each shim may implement the entire PCI header for the corresponding IP. The Yunit routes all accesses to the PCI header and the device memory space to the shim. The shim consumes all header read/write transactions and passes on other transactions to the IP. In some embodiments, the shim also implements all power management related features for the IP.

Thus, rather than being a monolithic compatibility block, embodiments that implement a Yunit take a distributed approach. Functionality that is common across all IPs, e.g. address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g. more than 90%) is common across all IPs. This enables a rapid reconfiguration of an existing shim for a new IP. Some embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

As shown in FIG. 2, each socket is coupled to a Memory Controller (MC)/Home Agent (HA) (such as MC0/HA0 through MC3/HA3). The memory controllers are coupled to a corresponding local memory (labeled as MEM0 through MEM3), which can be a portion of system memory (such as memory 912 of FIG. 9). In some embodiments, the memory controller (MC)/Home Agent (HA) (such as MC0/HA0 through MC3/HA3) can be the same or similar to agent 102-1 of FIG. 1 and the memory, labeled as MEM0 through MEM3, can be the same or similar to memory devices discussed with reference to any of the figures herein. Also, in one embodiment, MEM0 through MEM3 can be configured to mirror data, e.g., as master and slave. Also, one or more components of system 200 can be included on the same integrated circuit die in some embodiments.

Furthermore, one implementation (such as shown in FIG. 2) is for a socket glueless configuration with mirroring. For example, data assigned to a memory controller (such as MC0/HA0) is mirrored to another memory controller (such as MC3/HA3) over the PtP links.

Generally, when designing network systems, some primary considerations are to minimize area and power dissipation. Such limitations impose certain choices of topology, switching strategies, routing function and architectural implementations. Moreover, a network design may use several routers (such as routing logic 150) interconnected together to meet the bandwidth requirements of a specific system.

Figure 3:
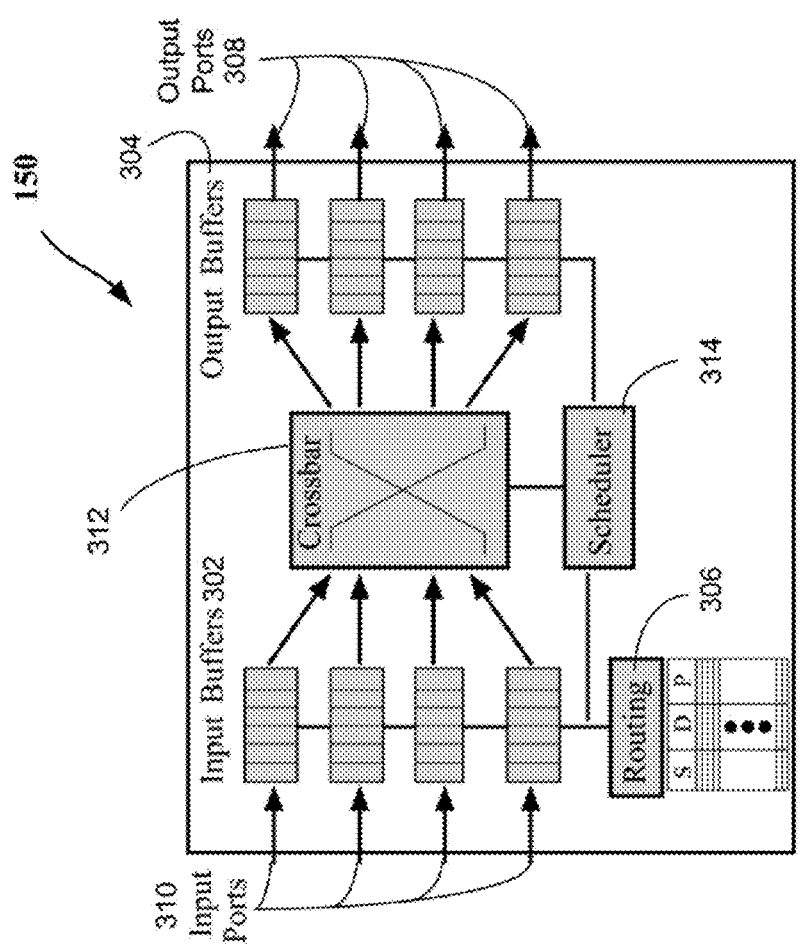
FIG. 3 shows a block diagram of a routing logic that can be used in one or more embodiments discussed herein.

FIG. 3 shows the architecture of routing logic that can be used in some embodiments. One or more Link Controllers ("LC", not shown) are used for coordinating the flow of message(s) (also referred to herein interchangeably as packet(s)) across the physical link of two adjacent switches. Buffers (such as input buffers 302 and output buffers 304) store messages that are transmitted across the routing logic 150. The routing unit logic 306 implements the routing function by selecting an output port 308 for an incoming packet at an input port 310. The crossbar unit logic 312 connects switch input buffers 302 to switch output buffers 304. The scheduler unit logic 314 (e.g. synchronously) configures the crossbar unit logic 312 at every cycle by matching the output port availabilities with the requests originating from the messages located at the input ports. The routing unit logic 306 is one of the most important parameters that drives the ultimate performance of a network. Designing a routing unit is challenging for lossless networks with multiple virtual channels, as it needs to strive for the maximum potential of the network (i.e., consuming low power while achieving high bandwidth and low latency), while keeping the network totally connected and safe from deadlocks, live-locks, etc. Messages generally carry a destination address in header flit. For every header flit that arrives at the routing logic 150 through a particular input port (e.g. S), the destination address (e.g. D) is inspected and all possible output ports (e.g., P) are selected. In some embodiments, a table based approach is used which stores the output port(s) that could be used for each destination node. In other embodiments, a minimal path distributed routing scheme is used that stores the output port(s) that could be used for each destination node. The later method may use minimal logic and allows the use of different routing algorithms, and replaces the expensive routing tables (in terms of energy-consumption and area) at switches with a fast and efficient set of logic blocks.

Figure 4:
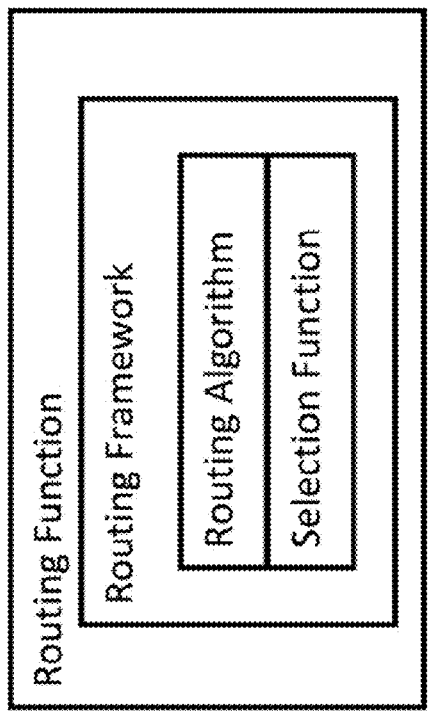
FIG. 4 illustrates a block diagram for a routing function, according to an embodiment

FIG. 4 illustrates a block diagram of the main components of a routing function, according to an embodiment. In an embodiment, the routing function is implemented by the routing unit logic 306 of FIG. 3. As shown in FIG. 4, there are two main components to consider when designing a routing function, the design of an efficient and effective routing framework and the selection of the routing algorithm and the selection function associated with it.

Generally, the routing algorithm dictates the paths used by packets over the network. Designers are faced with the problem of designing routing algorithms that deliver the lowest possible communication latency, use the internal bandwidth as efficiently as possible, and even more, adapt the traffic when congestion occurs or bottlenecks are detected. Routing algorithms can be classified into three different categories: deterministic, adaptive, and oblivious.

A deterministic routing algorithm always chooses the same path for a source-destination pair of nodes. One of the main benefits of deterministic approach is its simplicity, latency predictability as well as the preservation of in-order arrival of packets. However, deterministic routing may lead to an inefficient use of network resources since it always provides the same path for every source and destination pair. As such, networks using deterministic routing algorithms are unable to dynamically respond to network congestion or bottlenecks suffering from throughput degradation.

Oblivious routing, on the other hand, considers different paths from the same source-destination pair of nodes, but the path is selected at the source node without any knowledge of current network load.

The other alternative is to use adaptive routing where packets take different paths. However, turns are decided inside the network depending on the current traffic conditions; thus, avoiding contention in the network by using alternative routing paths. This leads to higher throughput and resource utilization under low and middle traffic conditions. Unfortunately, adaptive routing has the tendency to easily spread congestion across the network when high load or bottlenecks are present, leading to a dramatic loss of throughput when such conditions are present.

Moreover, adaptive routing mechanisms are composed with two different functions: routing and selection. As shown in FIG. 4, the routing function provides a set of output channels that provide deadlock freedom and full connectivity among nodes, according to an embodiment. The selection function is in charge of selecting only one option among all possible options based on information collected from other nodes about traffic conditions.

Designers usually implement simple routing frameworks using finite state machines for supporting deterministic routing algorithms such as Dimension Order Routing (DOR) where packets are first routed in horizontal dimension and then in the vertical dimension. Another method for implementing distributed routing uses a table which stores the output port(s) that should be used for each destination node. The main advantage of this approach is that the same generic design can be reused for implementing any network topology and routing algorithm. The main challenge is to design an efficient (in terms of area and energy) routing framework that combines the advantages of both routing algorithms, i.e., the latency predictability of deterministic routing under high load conditions and the high resource utilization under middle and low loud conditions provided by adaptive routing schemes.

Generally, traffic on an interconnect refers to messages being transmitted between two agents (such as agents 102 discussed with reference to FIG. 1). These messages can be transmitted as multiple flits. A flit (short for flow control digit) is the smallest unit of flow control. Messages are generally made up of multiple flits. Additionally, a "flit" may include 80 bits in an embodiment, e.g., with 8 bits for error detection, 8 bits for link-layer header, and 64 bits for data, although other configurations can also be used. Routers (e.g., logic 150) may be designed with the availability to support multiple virtual channels to allow all message types to be mapped to the same physical network; thus, providing optimal use of the available bandwidth for a given traffic mix at any time and at any point in the network.

Figure 5:
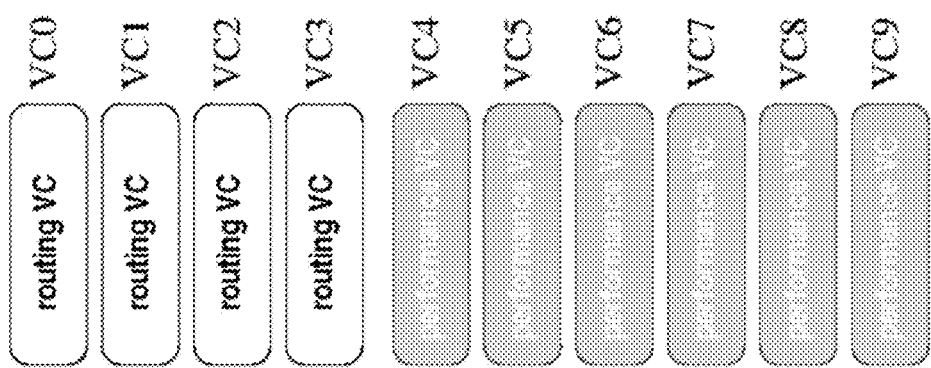
FIG. 5 shows a logical division in Virtual Channels of a routing logic's input port, according to an embodiment.

One network architecture embodiment uses virtual channel flow control to enable support for deadlock-free routing in various flavors of deterministic, fault-tolerant, and adaptive routing. Also, whereas buffers are allocated on a per flit basis, a Virtual Channel (VC) is allocated at the packet level. In an embodiment (such as shown in FIG. 5), the set of virtual channels (VCs) are flexibly partitioned into two logical sets: routing VCs (e.g., VC0-VC3) and performance VCs (e.g., VC4-VC9).

Routing VCs can be used for satisfying deadlock-freedom requirements of a particular full routing algorithm employed. In this context, the routing VCs provide the escape resources required for supporting deadlock-free routing algorithms. Also, they are used to provide traffic separation between message classes that will ensure a protocol with deadlock-freedom. To this end, an embodiment implements at least as many routing VCs as message classes that exist in the protocol, letting only packets belonging to the correct message class to use the routing VC allocated to that message class. Moreover, FIG. 5 shows the logical division in ten Virtual Channels of the router's input port, according to an embodiment. Four of the VCs (e.g., VC0-VC3) are routing VCs and the remaining six (e.g., VC4-VC9) belong to the performance VC class.

In some embodiments, supporting deadlock-free routing algorithms and protocol traffic separation means that for a routing VC to send a packet to another routing VC, it follows the rules: (a) the destination routing VC is at an 'escape' port (the dependency graph among routing VCs in the network for the same message class cannot present cycles if deadlock-freedom is required); and/or (b) the destination routing VCs message class match (protocol traffic separation)

Each routing VC may have its own reserved credit for receiving a flit (ensuring that, if the routing VC is not in use, then it provides at least space for one flit). Performance VCs may belong to a common shared pool of VCs used for performance improvement (e.g., both for adaptive or deterministic routing schemes). Performance VCs can form a pool of Virtual Channels available to be used by any packet without any restrictions, because of their message class affiliation. Contrary to Routing VCs, Performance VCs may not have any reserved credit, so any potential incoming packet has to resort to the shared credit pool to check for space.

As soon as the header flit with the required routing information arrives at an input port, it tries to gain access to the corresponding output port that couples to the following downstream routing logic. But for this, it needs to check for resources there (including buffer space and free VC availability).

In some embodiments, a priority ordering is used when requesting a free VC at the next muter's input port by:
(a) First, check for a free Performance VC and credit availability (the latter not ensured by the former). If both conditions are met, then prepare such a request for the switch allocation pipeline.
(b) Else, check for a free Routing VC belonging to the packet's message class. If found, then prepare such a request for the switch allocation pipeline.

In an embodiment, Virtual Channels are allocated on a per-packet basis. Hence, a VC can only be reused when all flits for the previous packet have been forwarded by the logic 150. For that reason, once the tail flit of a packet has departed from the input port then the VC is made available for the next incoming packet.

Figure 6:
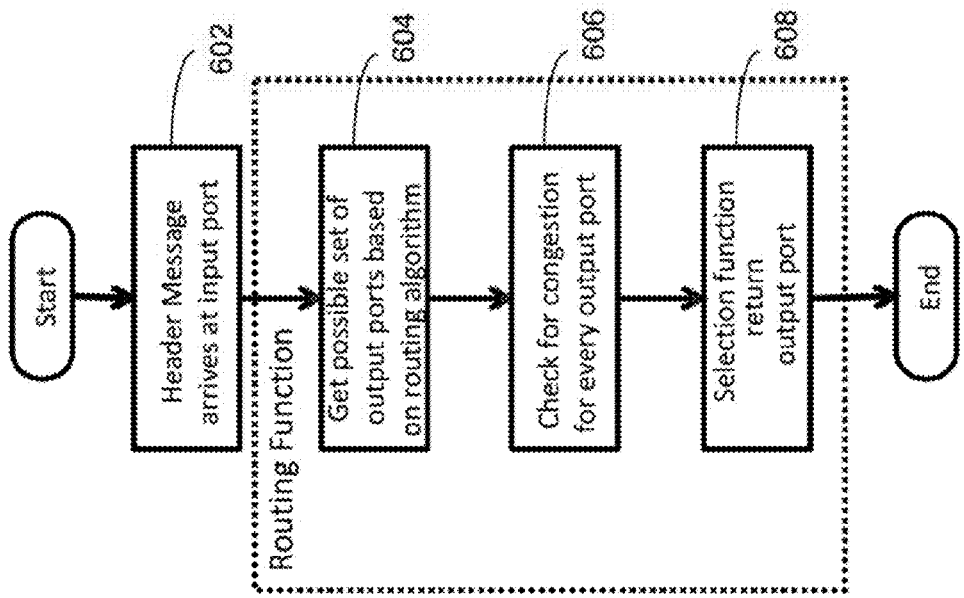
FIG. 6 illustrates a flow diagram of a method performed on header flits, according to an embodiment.

FIG. 6 illustrates a flow diagram of a method performed on header flits (first flit of a message) upon reception at the input port, according to an embodiment. This method may be repeated every time a new message header arrives at a switch (e.g., routing logic 150).

Referring to FIG. 6, at an operation 602, once a header message (e.g., a first flit of a message) arrives at an input port, the routing function (e.g., via logic 150) collects information regarding all possible output ports based on the underlying routing algorithm at an operation 604. For fully adaptive routing and partly-adaptive routing, the register output_port_0 stores the output port for escape mute, while register output_port_1 stores output port that provides adaptivity. At the same time (or after operation 604), the routing logic 150 may (e.g., constantly) update information about any congestion detected in the neighboring routers (e.g. logic 150 that are in proximity to another logic 150, where proximity indicates communication capability via one or more other logic 150) at an operation 606. Based on this information, the routing logic 150 selects the proper information about the two possible output ports and compares them against the configurable parameters (e.g., UPPER_PERFVC (upper performance VC), UPPER_CREDIT (upper credit value), LOWER_PERFVC (lower performance VC), and LOWER_CREDIT (lower credit value)) at an operation 608. This procedure may be summarized by updating a congestion flag register for each of the potential output ports (e.g., simultaneously). Moreover, the selection function is in charge of selecting the most convenient output port based on the congestion flag register updated during the previous step and the type of VC available at the output port. Once the routing function is finished, the packet context is updated at the switch and the packet proceeds to contest for the appropriate output port following the switch pipeline.

Furthermore, the routing algorithm is in charge of providing a set of output ports (based on the routing algorithm) that provides deadlock freedom and full connectivity among nodes. For example, among two possible output ports provided by the routing algorithm, output_port_0 is specified as the port that provides determinism to the routing function. When dealing with fully adaptive routing, this port is the one that provides the escape route. On the other hand, output_port_1 is seen as the adaptive option, and this port provides the routing function with the ability to become adaptive. In some cases, output_port_0 may be the only option that exists (i.e., when routing to only one dimension), whereas in some other cases, both output_port_0 and output_port_1 may exist. In the latter case, the selection function is in charge of selecting only one option among all possible based on information collected from other nodes about traffic conditions.

One router embodiment relies on a routing framework that implements a Content Aware Adaptive Throttle (CAAT) mechanism to perform the selection function. In particular, one fully adaptive routing algorithm constrains the use of adaptive output ports to those messages that have already used an escape VC in an embodiment. In addition, CAAT mechanism constrains the use of adaptivity when congestion appears on the current node. This way, during congestion, most of traffic follows the escape path (deterministic mute) avoiding a rapid spread of congestion across the whole network and its unpleasant drop off in performance while network stabilizes.

Figure 7:
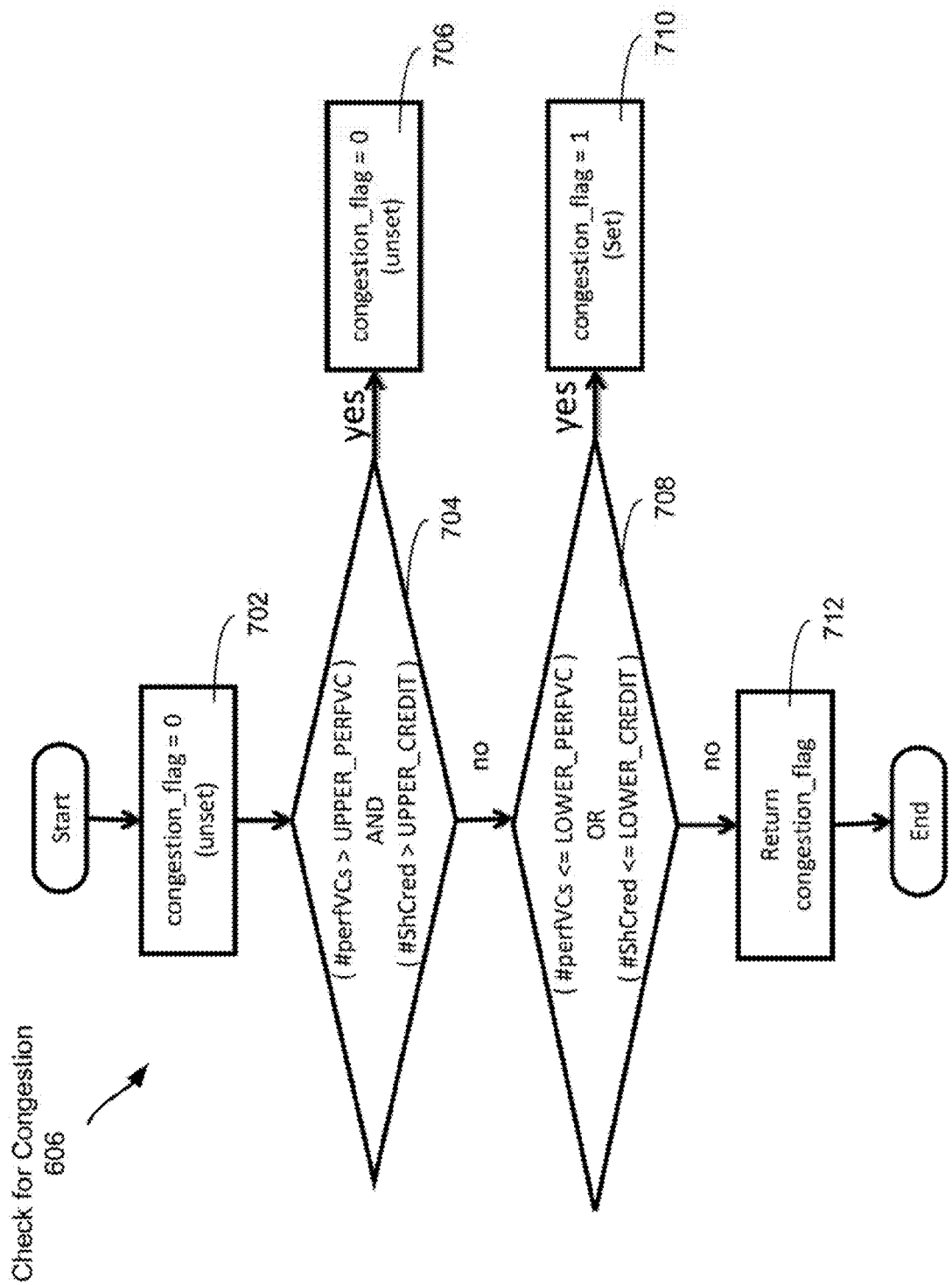
FIG. 7 illustrates a flow diagram of a method for checking congestion, according to an embodiment.

FIG. 7 illustrates a flow diagram of a method for checking congestion, according to an embodiment. More particularly, the method shown in FIG. 7 may be used to perform operation 606 of FIG. 6. This method may be repeated for each output port in the routing logic 150 cycle after cycle. For example, at the same time, new information about the number of performance VCs (#perfVCs) and number of shared credits (#ShCred) available in the neighboring router is updated every cycle. Further, in order to detect congestion, CAAT relies on the following configurable parameters UPPER_PERFVC, UPPER_CREDIT, LOWER_PERFVC, and LOWER_CREDIT.

At an operation 702, a congestion flag ("congestion_flag") is unset (e.g., to 0, or another value depending on the implementation). Some embodiments use two sets of configurable threshold values. Each set consists of the number of free performance VCs (UPPER_PERFVC and LOWER_PERFVC) and free shared credits (UPPER_CREDIT and LOWER_CREDIT). For example, the lower threshold can be set as 2 performance VCs and 2 free shared credits, while the upper threshold can be set to 5 performance VCs and 5 free shared credits. With this approach, it is clear that the bigger the value of lower parameters (LOWER_PERFVC, LOWER_CREDIT) the more deterministic the behavior of the routing algorithm becomes.

For each output port on a routing logic 150, if the resources on the port are greater than the upper threshold at operation 704 (e.g. where the number of performance VCs (#perfVCs) is greater than the upper performance VC (UPPER_PERFVC) and the number of shared credits (#ShCred) is greater than the upper credit value (UPPER_CREDIT)), a state bit (e.g., the congestion_flag) is cleared at operation 706. If the resource on the port is equal to or less than the lower threshold (e.g., where the number of performance VCs (#perfVCs) is less than or equal to the lower performance VC (LOWER_PERFVC) or the number of shared credits (#ShCred) is less than or equal to the lower credit value (LOWER_CREDIT)) at operation 708, a state bit (e.g., the congestion_flag) is set to indicate that the output port is in congestion at an operation 710. At an operation 712, the state bit (e.g., congestion_flag) is returned. Also, fully adaptive routing algorithms ensure deadlock freedom by ensuring that parameter LOWER_PERFVC is bigger than 0. This in turn ensures that output port 1 never blocks escape route (routing VC).

Figure 8:
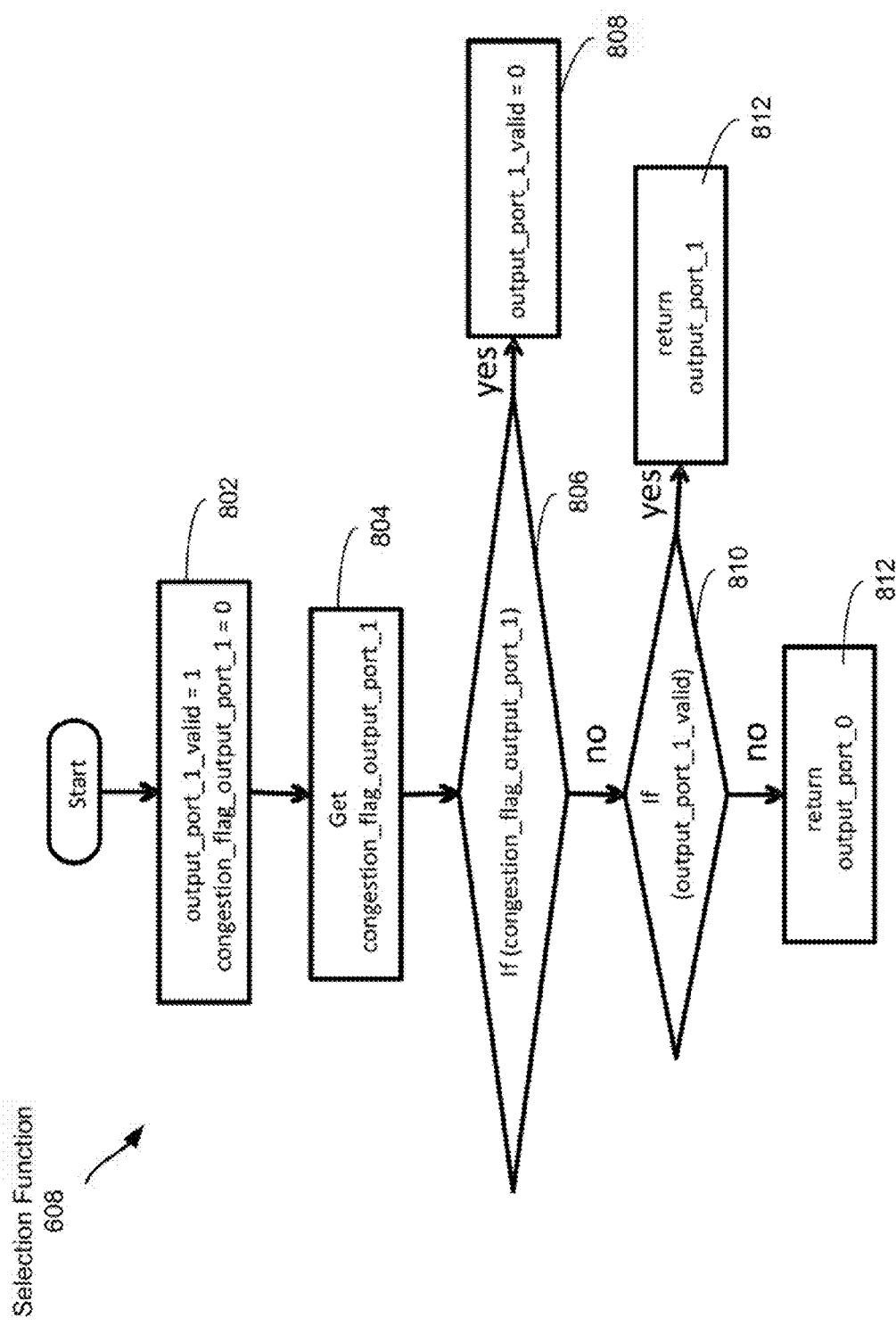
FIG. 8 illustrates a flow diagram of a method for selecting an output port, according to an embodiment.

The selection function (e.g., operation 608 of FIG. 6) in routing logic 150 is shown in the next flow diagram of FIG. 8. The method of FIG. 8 checks for the existence of congestion in output port 1 (e.g., which refers to the output port that provides adaptivity) and if detected, returns the deterministic port as the winner, nullifying any possible adaptivity on the route. Hence, method of FIG. 8 is performed based on the value of the congestion flag, the routing algorithm, and type of VC available at an output port (e.g., with the priority given to performance VCs).

More particularly, at an operation 802, output port 1 is set to valid and its congestion flag is cleared. An operation 804, detects the value for congestion flag at output port 1. If congestion exists at an operation 806, output port 1 validity bit/flag is cleared at an operation 808; otherwise, if output port 1 is valid at operation 810, output port 1 is returned at operation 812. If output port 1 is determined to be invalid at operation 810, output port 0 is returned at operation 812 instead of output port 1.

Accordingly, the CAAT mechanism described herein can be very effective in reducing the packet latency variation with fully-adaptive routing. In particular, when using a fully adaptive routing algorithm with Dimension Order Routing as escape routing, the CAAT mechanism can effectively reduce the variation of standard deviation of average packet latency while maintains throughput at acceptable levels when the network is under congestion. Hence, CAAT enables the routing function to judiciously switch between deterministic and adaptive routing based on the network's congestion conditions.

Figure 9:
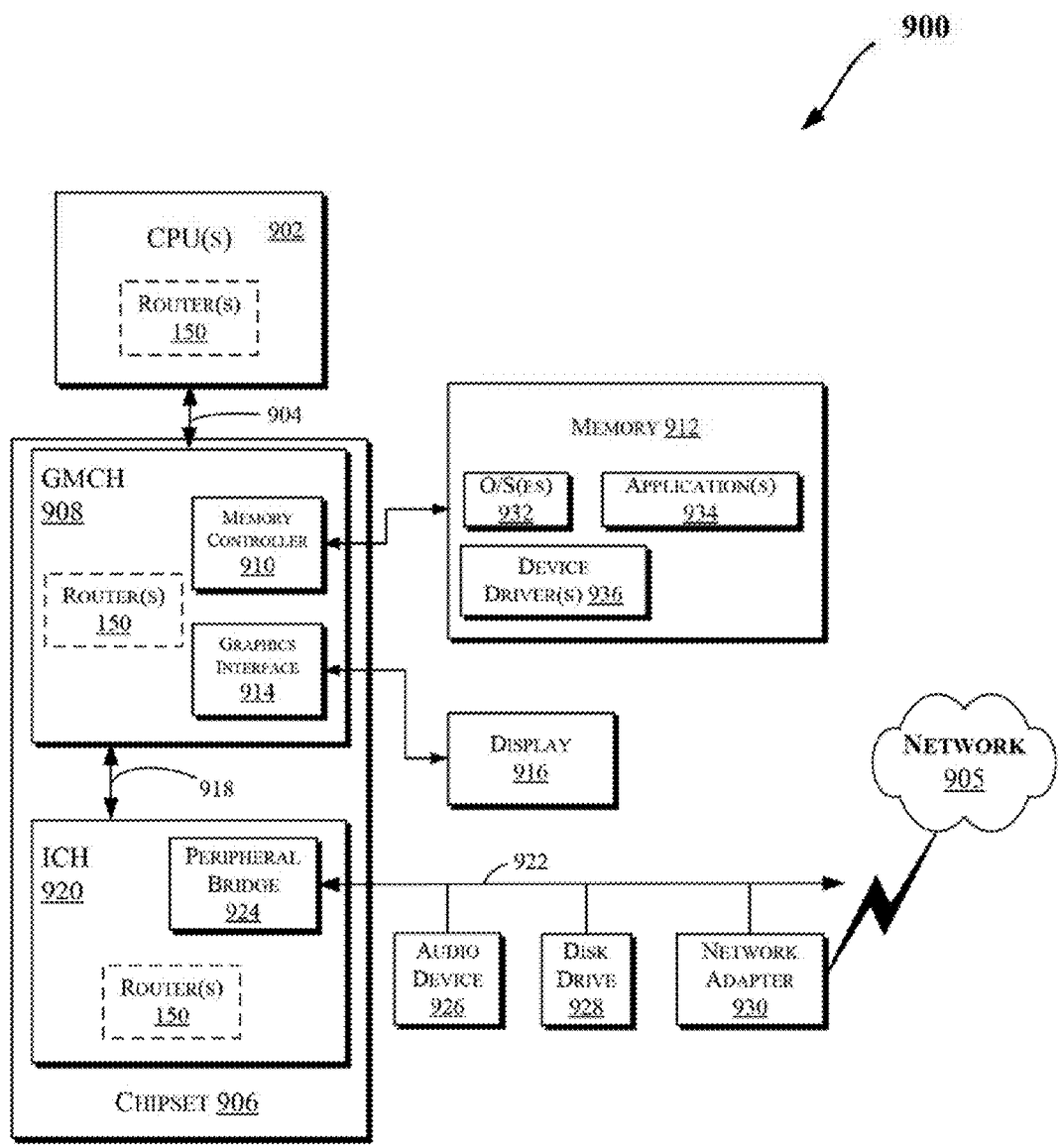
FIG. 9 illustrates a block diagram of an embodiment of a computing system, which can be utilized to implement one or more embodiments discussed herein.

FIG. 9 illustrates a block diagram of an embodiment of a computing system 900. One or more of the agents 102 of FIG. 1 may comprise one or more components of the computing system 900. Also, various components of the system 900 may include routing logic 150 as illustrated in FIG. 9. However, logic 150 may be provided in locations throughout the system 900, including or excluding those illustrated. The computing system 900 may include one or more central processing unit(s) (CPUs) 902 (which may be collectively referred to herein as "processors 902" or more generically "processor 902") coupled to an interconnection network (or bus) 904. The processors 902 may be any type of processor such as a general purpose processor, a network processor (which may process data communicated over a computer network 905), etc. (including a reduced instruction set computer (RISC) processor or a complex instruction set computer (CISC)). Moreover, the processors 902 may have a single or multiple core design. The processors 902 with a multiple core design may integrate different types of processor cores on the same integrated circuit (IC) die. Also, the processors 902 with a multiple core design may be implemented as symmetrical or asymmetrical multiprocessors.

The processor 902 may include one or more caches, which may be private and/or shared in various embodiments. Generally, a cache stores data corresponding to original data stored elsewhere or computed earlier. To reduce memory access latency, once data is stored in a cache, future use may be made by accessing a cached copy rather than prefetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 900. Additionally, such cache(s) may be located in various locations (e.g. inside other components to the computing systems discussed herein, including systems of FIG. 1, 2, 9, or 10).

A chipset 906 may additionally be coupled to the interconnection network 904. Further, the chipset 906 may include a graphics memory control hub (GMCH) 908. The GMCH 908 may include a memory controller 910 that is coupled to a memory 912. The memory 912 may store data, e.g., including sequences of instructions that are executed by the processor 902, or any other device in communication with components of the computing system 900. Also, in one embodiment of the invention, the memory 912 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 904, such as multiple processors and/or multiple system memories.

The GMCH 908 may further include a graphics interface 914 coupled to a display device 916 (e.g., via a graphics accelerator in an embodiment). In one embodiment, the graphics interface 914 may be coupled to the display device 916 via an accelerated graphics port (AGP). In an embodiment of the invention, the display device 916 (such as a flat panel display) may be coupled to the graphics interface 914 through, for example, a signal converter that translates a digital representation of an image stored in a storage device such as video memory or system memory (e.g. memory 912) into display signals that are interpreted and displayed by the display 916.

As shown in FIG. 9, a hub interface 918 may couple the GMCH 908 to an input/output control hub (ICH) 920. The ICH 920 may provide an interface to input/output (I/O) devices coupled to the computing system 900. The ICH 920 may be coupled to a bus 922 through a peripheral bridge (or controller) 924, such as a peripheral component interconnect (PCI) bridge that may be compliant with the PCIe specification, a universal serial bus (USB) controller, etc. The bridge 924 may provide a data path between the processor 902 and peripheral devices. Other types of topologies may be utilized. Also, multiple buses may be coupled to the ICH 920, e.g., through multiple bridges or controllers. Further, the bus 922 may comprise other types and configurations of bus systems. Moreover, other peripherals coupled to the ICH 920 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 922 may be coupled to an audio device 926, one or more disk drive(s) 928, and a network adapter 930 (which may be a NIC in an embodiment). In one embodiment, the network adapter 930 or other devices coupled to the bus 922 may communicate with the chipset 906. Also, various components (such as the network adapter 930) may be coupled to the GMCH 908 in some embodiments of the invention. In addition, the processor 902 and the GMCH 908 may be combined to form a single chip. In an embodiment, the memory controller 910 may be provided in one or more of the CPUs 902. Further, in an embodiment, GMCH 908 and ICH 920 may be combined into a Peripheral Control Hub (PCH).

Additionally, the computing system 900 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 928), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 912 may include one or more of the following in an embodiment: an operating system (O/S) 932, application 934, directory 901, and/or device driver 936. The memory 912 may also include regions dedicated to Memory Mapped I/O (MMIO) operations. Programs and/or data stored in the memory 912 may be swapped into the disk drive 928 as part of memory management operations. The application(s) 934 may execute (e.g. on the processor(s) 902) to communicate one or more packets with one or more computing devices coupled to the network 905. In an embodiment, a packet may be a sequence of one or more symbols and/or values that may be encoded by one or more electrical signals transmitted from at least one sender to at least one receiver (e.g. over a network such as the network 905). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 905).

In an embodiment, the application 934 may utilize the O/S 932 to communicate with various components of the system 900, e.g. through the device driver 936. Hence, the device driver 936 may include network adapter 930 specific commands to provide a communication interface between the O/S 932 and the network adapter 930, or other I/O devices coupled to the system 900, e.g., via the chipset 906.

In an embodiment, the O/S 932 may include a network protocol stack. A protocol stack generally refers to a set of procedures or programs that may be executed to process packets sent over a network 905, where the packets may conform to a specified protocol. For example, TCP/IP (Transport Control Protocol/Internet Protocol) packets may be processed using a TCP/IP stack. The device driver 936 may indicate the buffers in the memory 912 that are to be processed, e.g., via the protocol stack.

The network 905 may include any type of computer network. The network adapter 930 may further include a direct memory access (DMA) engine, which writes packets to buffers (e.g., stored in the memory 912) assigned to available descriptors (e.g. stored in the memory 912) to transmit and/or receive data over the network 905. Additionally, the network adapter 930 may include a network adapter controller, which may include logic (such as one or more programmable processors) to perform adapter related operations. In an embodiment, the adapter controller may be a MAC (media access control) component. The network adapter 930 may further include a memory, such as any type of volatile/nonvolatile memory (e.g., including one or more cache(s) and/or other memory types discussed with reference to memory 912).

Figure 10:
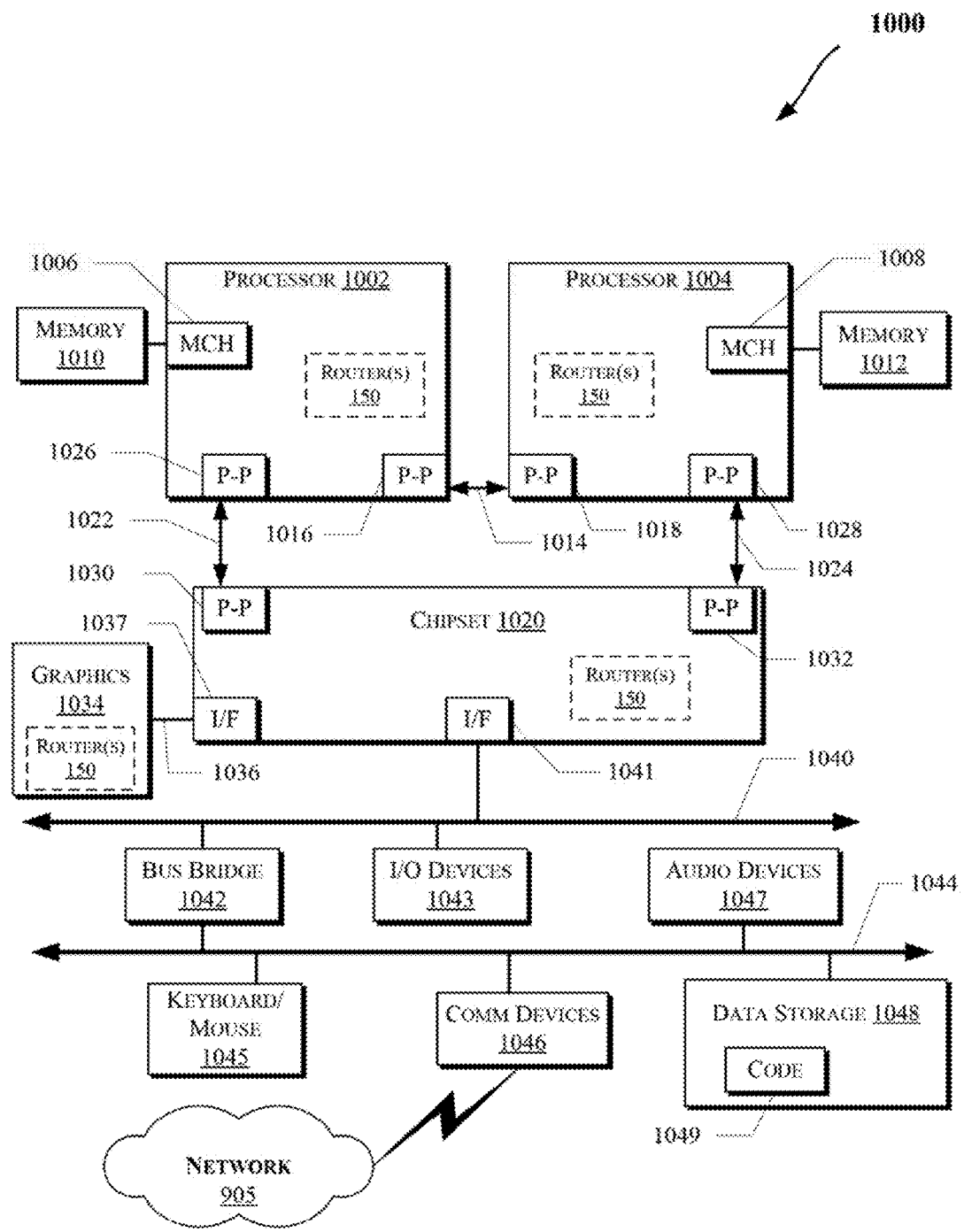
FIG. 10 illustrates a block diagram of an embodiment of a computing system, which can be utilized to implement one or more embodiments discussed herein.

FIG. 10 illustrates a computing system 1000 that is arranged in a point-to-point (PIP) configuration, according to an embodiment of the invention. In particular, FIG. 10 shows a system where processors, memory, and input/output devices are interconnected by a number of point-to-point interfaces. The operations discussed with reference to FIGS. 1-9 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (GMCH) 1006 and 1008 to enable communication with memories 1010 and 1012. The memories 1010 and/or 1012 may store various data such as those discussed with reference to the memory 1012 of FIG. 10. As shown in FIG. 10, the processors 1002 and 1004 (or other components of system 1000 such as chipset 1020, I/O devices 1043, etc.) may also include one or more cache(s) such as those discussed with reference to FIGS. 1-10.

In an embodiment, the processors 1002 and 1004 may be one of the processors 1002 discussed with reference to FIG. 10. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PIP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

In at least one embodiment, a directory cache and/or logic may be provided in one or more of the processors 1002, 1004 and/or chipset 1020. Other embodiments of the invention, however, may exist in other circuits, logic units, or devices within the system 1000 of FIG. 10. Furthermore, other embodiments of the invention may be distributed throughout several circuits, logic units, or devices illustrated in FIG. 10. For example, various components of the system 1000 may include the logic 150 of FIG. 1. However, logic 150 may be provided in locations throughout the system 1000, including or excluding those illustrated.

The chipset 1020 may communicate with the bus 1040 using a PIP interface circuit 1041. The bus 1040 may have one or more devices that communicate with it, such as a bus bridge 1042 and I/O devices 1043. Via a bus 1044, the bus bridge 1042 may communicate with other devices such as a keyboard/mouse 1045, communication devices 1046 (such as modems, network interface devices, or other communication devices that may communicate with the computer network 1005), audio I/O device, and/or a data storage device 1048. The data storage device 1048 may store code 1049 that may be executed by the processors 1002 and/or 1004.

The following examples pertain to further embodiments. Example 1 includes 1 includes an apparatus comprising: routing logic to determine an output port for transmission of an incoming message that is to be received at an input port, wherein the routing logic is to select the output port from a first output port and a second output port based on congestion information to be detected at one or more other routing logic communicatively coupled to the routing logic, wherein the first output port is to provide a deterministic route for the incoming message and the second output port is to provide an adaptive route for the incoming message. Example 2 includes the apparatus of example 1, wherein the deterministic route is capable to choose a same path for a source and destination pair of nodes. Example 3 includes the apparatus of example 1, wherein the adaptive route is capable to choose a different path for a source and destination pair of nodes based on traffic information. Example 4 includes the apparatus of example 1, wherein the congestion information is to be determined based on a comparison of a number of performance virtual channels, capable to communicate the incoming message, and a lower performance virtual channel threshold. Example 5 includes the apparatus of example 1, wherein the congestion information is to be determined based on a comparison of a number of shared credits, corresponding to one or more virtual channels capable to communicate the incoming message, and a lower credit threshold. Example 6 includes the apparatus of example 1, wherein the routing logic is to determine the output port in response to detection of a first flit of the incoming message. Example 7 includes the apparatus of example 1, comprising scheduler logic to match availability of the output port with the incoming message. Example 8 includes the apparatus of example 1, comprising crossbar logic to communicatively couple the input port and the output port. Example 9 includes the apparatus of example 1, comprising logic to support deadlock free routing through allocation of one or more buffers, to store data corresponding to the incoming message, on a per flit basis. Example 10 includes the apparatus of example 1, comprising logic to support deadlock free routing through allocation of one or more virtual channels, to communicate data corresponding to the incoming message, on a packet level basis. Example 11 includes the apparatus of example 10, wherein the packet is to comprise a plurality of flits. Example 12 includes the apparatus of example 1, wherein the routing logic is to provide deadlock free routing based a plurality of routing virtual channels. Example 13 includes the apparatus of example 1, wherein the routing logic is to couple a first agent to a second agent via a link, wherein the link is to comprise a point-to-point interconnect. Example 14 includes the apparatus of example 13, wherein one or more of the first agent and the second agent are to comprise a plurality of processor cores. Example 15 includes the apparatus of example 13, wherein one or more of the first agent and the second agent are to comprise a plurality of sockets. Example 16 includes the apparatus of example 13, wherein one or more of the first agent, the second agent, the routing logic, and memory are on a same integrated circuit die.

Example 17 includes a method comprising: determining, at routing logic, an output port for transmission of an incoming message that is to be received at an input port, wherein the routing logic is to select the output port from a first output port and a second output port based on congestion information to be detected at one or more other routing logic communicatively coupled to the routing logic, wherein the first output port is to provide a deterministic route for the incoming message and the second output port is to provide an adaptive route for the incoming message. Example 18 includes the method of example 17, further comprising matching availability of the output port with the incoming message. Example 19 includes the method of example 17, further comprising communicatively coupling the input port and the output port. Example 20 includes the method of example 17, further comprising supporting deadlock free routing through allocation of one or more buffers, to store data corresponding to the incoming message, on a per flit basis. Example 21 includes the method of example 17, further comprising supporting deadlock free routing through allocation of one or more virtual channels, to communicate data corresponding to the incoming message, on a packet level basis.

Example 22 includes a system comprising: memory to store congestion information; and routing logic, coupled to the memory, to determine an output port for transmission of an incoming message that is to be received at an input port, wherein the routing logic is to select the output port from a first output port and a second output port based on the congestion information to be detected at one or more other routing logic communicatively coupled to the routing logic, wherein the first output port is to provide a deterministic route for the incoming message and the second output port is to provide an adaptive route for the incoming message. Example 23 includes the system of example 22, wherein the deterministic route is capable to choose a same path for a source and destination pair of nodes. Example 24 includes the system of example 22, wherein the adaptive route is capable to choose a different path for a source and destination pair of nodes based on traffic information.

Example 25 includes an apparatus comprising: means for determining, at routing logic, an output port for transmission of an incoming message that is to be received at an input port, wherein the routing logic is to select the output port from a first output port and a second output port based on congestion information to be detected at one or more other routing logic communicatively coupled to the routing logic, wherein the first output port is to provide a deterministic route for the incoming message and the second output port is to provide an adaptive route for the incoming message. Example 26. The apparatus of example 25, further comprising means for matching availability of the output port with the incoming message. Example 27 includes the apparatus of example 25, further comprising means for communicatively coupling the input port and the output port. Example 28 includes the apparatus of example 25, further comprising means for supporting deadlock free routing through allocation of one or more buffers, to store data corresponding to the incoming message, on a per flit basis. Example 29 includes the apparatus of example 25, further comprising means for supporting deadlock free routing through allocation of one or more virtual channels, to communicate data corresponding to the incoming message, on a packet level basis.

Example 30 includes a computer-readable medium comprising one or more instructions that when executed on a processor configure the processor to perform one or more operations of any of examples 17 to 21. Example 31 includes the method of any of examples 17 and 18, further comprising communicatively coupling the input port and the output port. Example 32 includes the method of any of examples 17 to 19, further comprising supporting deadlock free routing through allocation of one or more buffers, to store data corresponding to the incoming message, on a per flit basis. Example 33 includes the method of any of examples 17 to 20, further comprising supporting deadlock free routing through allocation of one or more virtual channels, to communicate data corresponding to the incoming message, on a packet level basis.

In various embodiments of the invention, the operations discussed herein, e.g. with reference to FIGS. 1-10, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-10. Additionally, such computer-readable media may be downloaded as a computer program product, wherein the program may be transferred from a remote computer (e.g. a server) to a requesting computer (e.g., a client) through data signals in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   routing logic to determine an output port for transmission of an incoming message that is to be received at an input port,
   wherein the routing logic is to select the output port from a first output port and a second output port based on congestion information to be detected at one or more other routing logic communicatively coupled to the routing logic, wherein the first output port is to provide a deterministic route for the incoming message and the second output port is to provide an adaptive route for the incoming message, wherein the congestion information is to be determined based on one of: a comparison of a number of performance virtual channels and a lower performance virtual channel threshold; or a comparison of a number of shared credits and a lower credit threshold.

2. The apparatus of claim 1, wherein the deterministic route is capable to choose a same path for a source and destination pair of nodes.

3. The apparatus of claim 1, wherein the adaptive route is capable to choose a different path for a source and destination pair of nodes based on traffic information.

4. The apparatus of claim 1, wherein the performance virtual channels are capable to communicate the incoming message.

5. The apparatus of claim 1, wherein the shared credits correspond to one or more virtual channels capable to communicate the incoming message.

6. The apparatus of claim 1, wherein the routing logic is to determine the output port in response to detection of a first flit of the incoming message.

7. The apparatus of claim 1, comprising scheduler logic to match availability of the output port with the incoming message.

8. The apparatus of claim 1, comprising crossbar logic to communicatively couple the input port and the output port.

9. The apparatus of claim 1, comprising logic to support deadlock free routing through allocation of one or more buffers, to store data corresponding to the incoming message, on a per flit basis.

10. The apparatus of claim 1, comprising logic to support deadlock free routing through allocation of one or more virtual channels, to communicate data corresponding to the incoming message, on a packet level basis.

11. The apparatus of claim 10, wherein the packet is to comprise a plurality of flits.

12. The apparatus of claim 1, wherein the routing logic is to provide deadlock free routing based a plurality of routing virtual channels.

13. The apparatus of claim 1, wherein the routing logic is to couple a first agent to a second agent via a link, wherein the link is to comprise a point-to-point interconnect.

14. The apparatus of claim 13, wherein one or more of the first agent and the second agent are to comprise a plurality of processor cores.

15. The apparatus of claim 13, wherein one or more of the first agent and the second agent are to comprise a plurality of sockets.

16. The apparatus of claim 13, wherein one or more of the first agent, the second agent, the routing logic, and memory are on a same integrated circuit die.

17. A method comprising:
    determining, at routing logic, an output port for transmission of an incoming message that is to be received at an input port,
    wherein the routing logic is to select the output port from a first output port and a second output port based on congestion information to be detected at one or more other routing logic communicatively coupled to the routing logic, wherein the first output port is to provide a deterministic route for the incoming message and the second output port is to provide an adaptive route for the incoming message, wherein the congestion information is determined based on one of: a comparison of a number of performance virtual channels and a lower performance virtual channel threshold; or a comparison of a number of shared credits and a lower credit threshold.

18. The method of claim 17, further comprising matching availability of the output port with the incoming message.

19. The method of claim 17, further comprising communicatively coupling the input port and the output port.

20. The method of claim 17, further comprising supporting deadlock free routing through allocation of one or more buffers, to store data corresponding to the incoming message, on a per flit basis.

21. The method of claim 17, further comprising supporting deadlock free routing through allocation of one or more virtual channels, to communicate data corresponding to the incoming message, on a packet level basis.

22. A system comprising:
    memory to store congestion information; and
    routing logic, coupled to the memory, to determine an output port for transmission of an incoming message that is to be received at an input port,
    wherein the routing logic is to select the output port from a first output port and a second output port based on the congestion information to be detected at one or more other routing logic communicatively coupled to the routing logic, wherein the first output port is to provide a deterministic route for the incoming message and the second output port is to provide an adaptive route for the incoming message, wherein the congestion information is to be determined based on one of: a comparison of a number of performance virtual channels and a lower performance virtual channel threshold; or a comparison of a number of shared credits and a lower credit threshold.

23. The system of claim 22, wherein the deterministic route is capable to choose a same path for a source and destination pair of nodes.

24. The system of claim 22, wherein the adaptive route is capable to choose a different path for a source and destination pair of nodes based on traffic information.

* * * * *